Feb. 14, 1950      H. S. WARKENTIN      2,497,523
ELECTRICAL CABLE DISCONNECT
Filed March 14, 1947
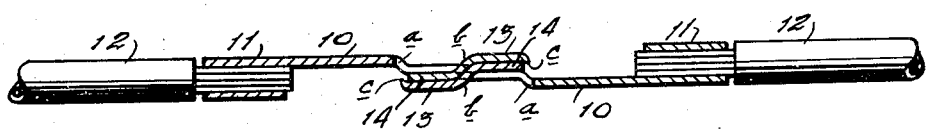
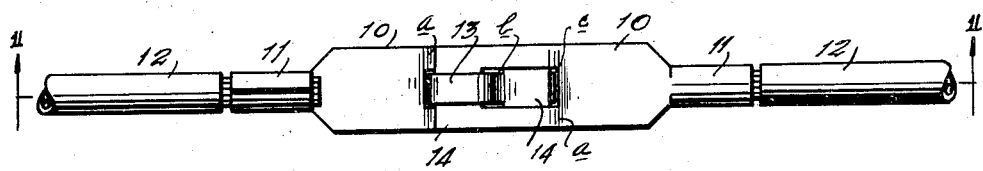
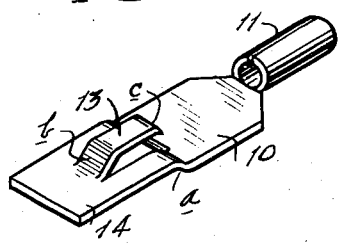
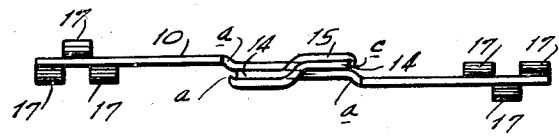
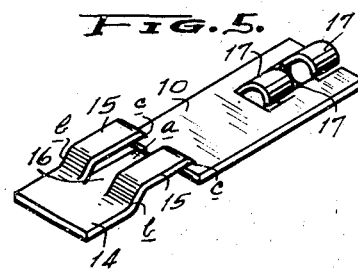
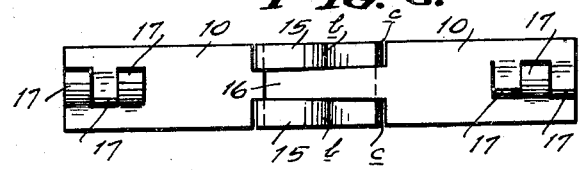
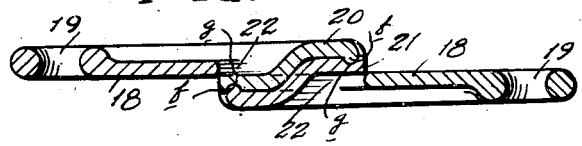
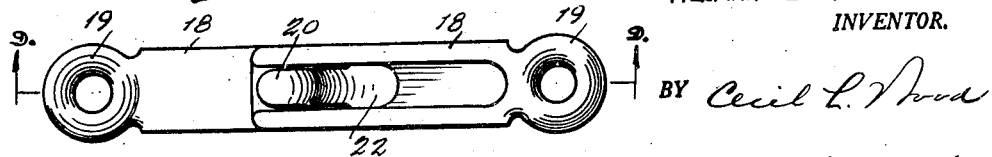
HERMAN S. WARKENTIN
INVENTOR.
BY *Cecil L. Wood*
ATTORNEY Patented Feb. 14, 1950

2,497,523

UNITED STATES PATENT OFFICE 2,497,523

ELECTRICAL CABLE DISCONNECT

Herman S. Warkentin, Fort Worth, Tex.

Application March 14, 1947, Serial No. 734,586

2 Claims. (Cl. 287—76)

This invention relates to coupling devices for electrical conductors, and the like, and it has particular reference to a disconnect unit formed by stamping, or other processes, from suitable conductive materials, such as copper, or the like, and its principal object resides in the provision of a simple and economical unit formed in one piece with one or more integral tensioned fingers by which the units can be detachably connected in pairs to provide a flexible and dependable connection in electrical circuits.

An object of the invention is manifest in the provision of a coupling unit capable of being economically produced in a single design so that a standard connector system will prevail in its use, thus obviating the necessity for creating different forms to be employed in pairs, which would not only increase the cost of production but would obviously result in increased installation expense.

Broadly, the invention contemplates the provision of a coupling unit designed to make possible the expeditious connection and disconnection of all types of wiring circuits in electrical systems and provides, in a single unit, a coupler capable of being utilized in single cable couplings, connector blocks, multiple connectors, connector strips, and the like, to afford a positive connection which is incapable of disengagement by accident.

While the foregoing objects are paramount, other and lesser objects will become manifest as the description proceeds, taken in connection with the appended drawings wherein:

Figure 1 illustrates the invention, in longitudinal section taken on lines 1—1 of Figure 2, in paired association, and having cables attached.

Figure 2 is a plan view of the invention, in its preferred form, shown in paired interlocking connection, cables being attached thereto.

Figure 3 is a perspective view of the invention illustrating the offset finger on one surface by which two units can be interlocked.

Figure 4 is a side elevational view showing a modified form of the invention in paired interlocked association.

Figure 5 illustrates, in perspective, the modification of the invention shown in Figure 4, in which a plurality of the offset fingers are formed.

Figure 6 is a plan view showing the form of the invention illustrated in Figures 4, 5 and 6 in paired interlocking arrangement.

Figure 7 is an end view of the invention showing the cable connecting members.

Figure 8 is a fragmentary longitudinal sectional view of the interlocking contact between the offset fingers when one of the units is coupled with a mate.

Figure 9 illustrates, in longitudinal section, the application of the invention as a coupler for wire cables, or the like, and Figure 10 is a plan view of the form of unit shown in Figure 9, the same being preferably cast.

It is desirable that the invention be formed by stamping from a suitable conductive material, such as copper, or the like, to provide a body portion 10 of greater length than width, such as the forms illustrated in Figures 3 and 5. A suitable die may be provided by which the invention can be cut to the proper shape and dimension and its appurtenances formed integral therewith providing a unitary structure. It is desirable to provide laterally extending tabs on one end, in the preferred form illustrated in Figure 3, which tabs may be rolled upwardly to provide a sleeve 11 affording a receptacle for the end of a cable 12, in the manner illustrated in Figures 1 and 2.

Intermediate the end of the sleeve 11, where the latter joins the body member 10, and the opposite end of the body member 10 the latter is offset upwardly with a double bend $a$ substantially the thickness of the body member 10, as illustrated in Figures 1 and 4. A tongue or finger 13 is cut out of the body member 10 longitudinally thereof and is pressed outwardly, being offset at $b$ where it joins the body member 10, and therefore spaced from the latter a distance equal to the thickness of the material from which the body member 10 is formed. The free end $c$ of the member 13 is turned downwardly, as shown in Figures 1, 3 and 4, to provide a function which will be presently described.

It will become apparent that only a single form of the invention need be provided, embodying the features described, to effect an efficient and positive coupling when the invention is associated in interlocking arrangement as illustrated in Figures 1, 2 and 4. The opposing faces of a pair of the connectors may be arranged together, in operation, so that the ends $c$ of the members 13 can be slidably interlocated and the body members 10 moved longitudinally in opposite directions, so that the members 13 slide over the end portions 14 of the body members 10 so that the downwardly curved ends $c$ of the members 13 overreach the extremities of the body members 10, in the manner illustrated in Figure 1, to provide interlocking association of the couplings.

It is apparent that the invention may be modified to include several forms without departing from the principal of the interlocking features embodied in the form of the invention just described. As, for example, the form of the invention illustrated in Figures 4, 5, 6 and 8, while in general principal resembles the structure illustrated in Figures 1, 2 and 3, has fingers 15 cut from either side of the body portion 10 and spaced by a narrow strip 16 therebetween which also has the offset bend $a$ therein and whereby the interlocking association illustrated in Figures 4 and 6 can be accomplished. The members 15 have the downwardly turned ends $c$, previously described, which engage the ends 14 of the body members 10 in the manner illustrated in Figure 4.

The body member 10 of the modified form of the invention shown in Figures 4, 5 and 6 has strips cut transversely thereof at one end and curved outwardly in staggered relationship in opposite directions, as shown in Figures 4 and 5, to provide means for the attachment of the end of the cable 12. These members 17 can be clamped by pressure upon the ends of the cables 12 in such a manner as to provide a positive connection without the use of solder, or the like. The arrangement of the member 17 is more particularly shown in Figure 7. The interlocking association of the body members 10, in the form of the invention illustrated in Figures 4, 5 and 6, is accomplished in exactly the same manner as that in which the preferred form of the invention, shown in Figures 1, 2 and 3, is assembled.

In order to provide a more positive association of the body members 10 the outer ends of the members 13 or 15 may be embossed at $d$ to provide a conforming depression for an embossing $e$ formed in the ends of the members 14 of the body members 10, in the manner shown in Figure 8, affording a frictional engagement between the members 10 to insure against accidental displacement of the parts resulting in a defective connection. It is not considered necessary to provide the indentations or embossings $e$ and $d$, but it is apparent that such an expedient may become desirable in such types of installations.

It is contemplated that the invention may be employed as a coupling for cables, and the like, having a multitude of uses, and it is desirable to form the invention by casting, or the like, in the manner illustrated in Figures 9 and 10.

In this form the invention comprises a body member 18 which is formed with eyelets 19 at one end and has a tongue 20 which rises above one plane surface of the member 18 and extends rearwardly thereof, as in Figure 9, and which has a ball $f$ on its undersurface at its outer end, as in Figure 9, corresponding to a recess $g$ formed in the opposite end 21 of the member 18, so that when the tongue 20 is arranged through the opening 22 of the opposite member 18, to which it is applied, and is arranged in the interlocking association shown in Figure 9, the paired members 18 cannot be readily disengaged.

The association of the members 18 is illustrated in Figures 9 and 10, their interlocking relationship being identical with that of the members 10 illustrated in Figures 1 to 8, inclusive.

Manifestly, the structure herein shown and described is capable of considerable modifications, from time to time, by persons skilled in the art, without departing from the spirit and intent of the invention or the scope of the appended claims.

What is claimed is:

1. In a connector unit for coupling electric conductors, the combination comprising a die formed body element of a conductive material, a finger cut from said body and offset therefrom to extend parallel thereto but spaced therefrom, an offset formed transversely of said body at the end of said finger and opposite from the offset of said finger whereby the said unit can be firmly connected with a similar unit, the finger of each unit interlocking with that of the other, and a sleeve formed with said body providing means for connecting the same to a conductor.

2. In a connector unit for coupling a pair of electric conductors, in combination, a die stamped plate having a sleeve formed on one end adapting the same for rigid attachment to a conductor, a strip cut from said plate along one end and each of its sides and spaced outwardly therefrom the thickness of said plate, an offset formed transversely of said plate at the end of said strip and opposite to the offset of said strip with respect to said plate whereby said unit can be firmly joined with a similar unit in interlocking said strips in opposing arrangement.

HERMAN S. WARKENTIN.

REFERENCES CITED

The following references are of record in the file of this patent:

UNITED STATES PATENTS

| Number | Name | Date |
|---|---|---|
| 180,910 | Olmsted | Aug. 8, 1876 |
| 1,047,376 | Bryntison | Dec. 17, 1912 |
| 1,678,166 | Repay | July 24, 1928 |
| 2,335,843 | Rogoff | Nov. 30, 1943 |
| 2,336,385 | Batcheller | Dec. 7, 1943 |
| 2,347,089 | Donaldson | Apr. 18, 1944 |
| 2,406,895 | Olson | Sept. 3, 1946 |